(12) United States Patent
Ogale et al.

(10) Patent No.: US 7,153,452 B2
(45) Date of Patent: Dec. 26, 2006

(54) MESOPHASE PITCH-BASED CARBON FIBERS WITH CARBON NANOTUBE REINFORCEMENTS

(75) Inventors: Amod A. Ogale, Clemson, SC (US); Dan D Edie, Senéca, SC (US); Apparao M. Rao, Anderson, SC (US)

(73) Assignee: Clemson University, Clemson, SC (US)

( * ) Notice: Subject to any disclaimer, the term of this patent is extended or adjusted under 35 U.S.C. 154(b) by 125 days.

(21) Appl. No.: 10/662,109

(22) Filed: Sep. 12, 2003

(65) Prior Publication Data

US 2004/0096388 A1 May 20, 2004

Related U.S. Application Data

(60) Provisional application No. 60/410,231, filed on Sep. 12, 2002.

(51) Int. Cl.
*H01B 1/04* (2006.01)
(52) U.S. Cl. ............... 252/502; 252/510; 423/447.1
(58) Field of Classification Search ............ 252/502, 252/510, 511; 423/447.1, 447.2
See application file for complete search history.

(56) References Cited

U.S. PATENT DOCUMENTS 6,183,854 B1 * 2/2001 Stiller et al. ............ 428/312.2

6,491,891 B1 * 12/2002 Klett et al. ............ 423/445 R

OTHER PUBLICATIONS

Cho et al, "Structure of carbon fiber obtained from nanotube-reinforced mesophase pitch", Carbon (May 2003), 41(7), 1419-1424.*
Andrews et al., "Continuous Production of aligned carbon nanotubes: a step closer to commercial realization," Chemical Physics Letters, 303, 467-474, 1999.
Adnrews et al., "Nanotube composite carbon fibers," Applied Physics Letters, 75(9), 1329-31, 1999.
Mochida, et al., "Microstructure of Mesophase Pitch-Based Carbon Fiber and Its Control," Carbon, 34 (8), 941-956, 1996.
Jones, Fain, and Edie, "Structural Development in Mesophase Pitch Based Carbon Fibers Produced from Naphthalene," Carbon, 35 (11), 1553-43, 1997.
Bourrat, Roche and Lavin, "Structure of Mesophase Pitch Fibers," Carbon, 28 (2/3), 435-446, 1990.
Ogale, Lin, Anderson and Kearns, "Orientation and Dimensional Changes in Mesophase Picth-Based Carbon Fibers," Carbon, 40 (8), 1309-1319, 2002.

* cited by examiner

Primary Examiner—Mark Kopec
(74) Attorney, Agent, or Firm—Leigh P. Gregory

(57) ABSTRACT

A modified, mesophase pitch-based carbon fiber is disclosed which includes carbon nanotube reinforcements in an amount ranging from about 0.01 percent to about 1.0 percent by weight. Although the reinforcements actually decrease the excellent tensile modulus of the unmodified fiber, they provide a random microstructure, which can decrease brittle failure of the fiber caused by propagation of a flaw.

5 Claims, 6 Drawing Sheets

MESOPHASE PITCH-BASED CARBON FIBERS WITH CARBON NANOTUBE REINFORCEMENTS

This patent application claims the benefit of priority of prior provisional application U.S. Ser. No. 60/410,231, filed Sep. 12, 2002.

FIELD OF THE INVENTION

The present invention is generally directed to mesophase pitch-based carbon fibers and is specifically directed to carbon fibers having carbon nanomaterial reinforcements.

BACKGROUND OF THE INVENTION

Mesophase pitch-based carbon fibers, having a highly ordered morphology, are well known in the art. That is, when heated, pitch materials form an isotropic mass. As heating continues, spherical bodies begin to form. The spherical bodies are of an anisotropic liquid crystalline nature as viewed under polarized light. These spheres continue to grow and coalesce until a dense continuous anisotropic phase forms, which phase has been termed the "mesophase." Thus, the mesophase is the intermediate phase or liquid crystalline region between the isotropic pitch and the semi-coke obtainable at higher temperatures. Mesophase pitch is extruded into fibers, oxidatively stabilized, and carbonized at high temperatures to form mesophase pitch-based carbon fibers.

As compared to PAN-based carbon fibers, these mesophase pitch-based carbon fibers have a relatively high tensile modulus but a relatively low tensile strength and a relatively low compressive strength. That is, the highly graphitic structure of these polymers is responsible for their high modulus and high thermal conductivity, but also for their low strength. The structured, crystalline morphology that provides for the high tensile modulus also allows for the brittle failure of the fibers caused by the propagation of even minute flaws. Thus, mesophase pitch-based carbon fibers are known to suffer from an imbalance of physical properties.

In order to reduce the tendency of mesophase pitch-based carbon fibers to fail through flaw propagation as described above, a variety of prior art patents have provided methods for producing such fibers with a less ordered, more random microstructure. To date, these efforts have focused on the method by which the fiber is extruded, including modification of the geometry of the die through which the fiber is extruded, rather than on composition modification.

Carbon nanotubes are very small carbon-based tubes having a hollow core having an average diameter of 5 to 10 nanometers. About the core is either a single wall of carbon or several walls. The walls resemble a hexagonal lattice of carbon rolled into a cylinder. Multi-wall carbon nanotubes average between about 30 and about 50 concentric, cylindrical walls. Carbon nanotubes are extremely stiff, having an average modulus of from about 400 to about 4,000 GPa.

Carbon nanotubes have been incorporated into isotropic pitch and made into isotropic pitch-based carbon fibers having carbon nanotubes ranging in amounts 1 percent by weight to 5 percent by weight and have been found to increase elastic modulus and conductivity as well as tensile strength.

SUMMARY OF THE INVENTION

The present invention is directed to modified, mesophase pitch-based carbon fibers, which have a random, rather than ordered, radial microstructure.

Specifically, the present invention is directed to a modified, mesophase pitch-based carbon fiber, which includes from about 0.01 percent to about 1.0 percent by weight, preferably from about 0.1 percent to about 0.5 percent by weight, of carbon nanomaterial reinforcements. Preferably the carbon nanomaterial reinforcements are carbon nanotubes. Most preferably, the carbon nanotubes are multi-wall carbon nanotubes. The present modified mesophase pitch-based carbon fiber exhibits decreased tensile modulus.

Additionally, the present invention is directed to a method for making a modified, mesophase pitch-based carbon fiber which includes the steps of: a) providing an anisotropic, mesophase pitch; b) heating the pitch to a temperature above the softening temperature of the pitch, preferably to about 280° C.; c) dispersing carbon nanomaterials in the heated pitch in an amount ranging from about 0.01 percent to about 1.0 percent by weight; d) heating the pitch to an extrusion temperature of at least about 300° C.; e) melt spinning a carbon nanomaterial-reinforced pitch fiber; f) thermosetting the spun fiber; and g) pyrolyzing the carbon nanomaterial-reinforced pitch fiber, thereby forming a carbon nanomaterial-reinforced pitch-based carbon fiber. Preferably, the carbon nanomaterials are added in an amount ranging from about 0.1 percent to about 0.5 percent by weight. Most preferably, the carbon nanomaterials are carbon nanotubes. It is also preferred that the carbon nanotubes are multi-wall carbon nanotubes.

Other principal advantages of the invention would become apparent to those skilled in the art upon review of the following drawings, the detailed description and the attached claims.

BRIEF DESCRIPTION OF THE FIGURES OF THE DRAWING

A better understanding of the present invention can be obtained when the following detailed description of the preferred embodiment is considered in conjunction with the following drawings, in which.

DETAILED DESCRIPTION OF THE PREFERRED EMBODIMENTS

The present invention is directed to mesophase pitch-based carbon fibers, which possess unique fiber morphology. As was discussed in the Background of the Invention, above, conventional mesophase pitch-based carbon fibers have a highly ordered, radial texture, such as is shown in the SEM micrograph of FIG. 3. This precise, graphitic structure is responsible for the excellent tensile modulus and conductivity that these fibers are widely recognized to possess.

Figure 4:
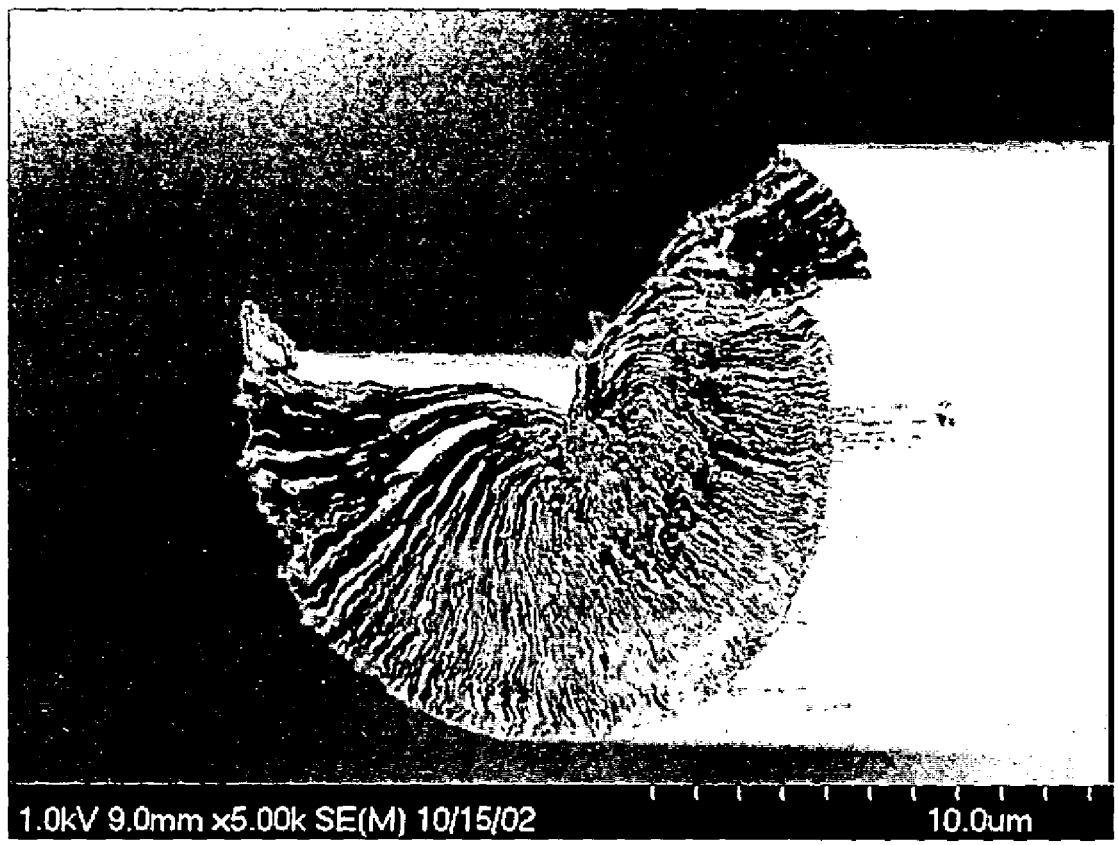
FIG. 4 is a scanning electron micrograph of a prior art, non-modified mesophase pitch-based carbon fiber including a sizable defect resulting from the brittle failure of the fiber caused by the propagation of a flaw.

However, it is this ordered, crystalline structure that is most often responsible for failure of these fibers. FIG. 4 is an SEM micrograph of a prior art mesophase pitch-based carbon fiber following the brittle failure of the fiber caused by the propagation of a flaw across the fiber. This type of failure is common for mesophase pitch-based carbon fibers.

In order to reduce the occurrence of the brittle failure of mesophase pitch-based carbon fibers, the present invention introduces a degree of randomness into the fiber structure by the addition of carbon nanomaterial reinforcements. Specifically, carbon nanomaterials, most preferably carbon nanotubes are blended in to molten pitch at or slightly above its softening temperature. The blend is then heated to an extrusion temperature which is about 20° C. to about 30° C. above the softening temperature and a pitch fiber is extruded by melt spinning. The pitch fiber having carbon particles dispersed therein is next oxidatively stabilized and then carbonized in a manner well known in the art in order to produce a modified mesophase pitch-based carbon fiber.

If the as-spun fibers produced from the mesophase were immediately subjected to carbonizing temperatures, the fibers would degrade and lose their anisotropic molecular orientation. Accordingly, the as-spun fibers are thermoset at temperatures ranging from about 200° C. to about 350° C., preferably from about 260° C. to about 320° C., in an oxygen atmosphere prior to carbonization. Also referred to as oxidative stabilization, this post-extrusion heat treatment is well known in the art.

Thereafter, the thermoset fibers are carbonized, also by conventional means.

In accordance with the present invention carbon nanomaterials may be introduced into the pitch in amounts ranging from about 0.01 percent to about 1.0 percent by weight. A more preferred range is from about 0.1 percent to about 0.5 percent by weight of carbon nanomaterials.

As is noted above, it is preferred that the carbon nanomaterials employed in accordance with the present invention are carbon nanotubes, most preferably multi-wall carbon nanotubes, although other carbon nanomaterials may be used. Examples of such include nanorods, nanocones, nanofibers, nanopowders, and nanoparticles. Without wishing to be bound by theory, it is believed that the presence of the carbon nanomaterials in the pitch during extrusion and then carbonization results in the formation of numerous small domains in the morphology of the final carbon fiber. That is, each or some of the nanomaterials act as nucleation sites for the multiple small domains, thus preventing the formation of the single large domain, which is the radial structure of the non-modified pitch-based carbon fiber. While disruption of this radial order results in an at least slight decrease in modulus, the propensity for brittle failure is greatly reduced.

The Examples set forth below demonstrate the effectiveness of the inclusion of a very small amount of carbon nanomaterials in mesophase pitch in producing a pitch-based carbon fiber having a fairly random microstructure. Generally, a random microstructure is desirable in order to provide increased tensile strength. As is shown in Table I, below, the present inventive fibers which were formed in accordance with the following Examples do not show increased tensile strength over the unloaded comparative fiber. It is believed that the reason for such reduced strength values is the likely existence of voids/bubbles or other such gross defects. The following Examples are directed to a batch process where the fibers are handled manually and where air can get into the pitch during mixing. As is noted below, in order to verify that the mixing step is not responsible for the random microstructure achieved by the present invention, the comparative fibers were mixed, even though no carbon nanomaterials were added. These mixed, pure pitch fibers displayed decreased tensile strength as compared to commercially available fibers made by a scaled-up, continuous process. Also, during batch mixing of the nanotubes with the pitch, the extent of mixing is not known precisely. It is likely that unbroken pieces from the "carpet" of carbon nanotubes may remain in the mixed pitch. Such large chunks would deteriorate properties in the same manner as voids or bubbles. Thus, it is believed that the fibers made in accordance with the following Examples, which demonstrate a desirably random microstructure, fail to exhibit improved tensile strength because of defects which are a consequence of inadequate dispersion and batch processing.

The following Examples are presented in order to clarify, and not restrict, the present invention.

EXAMPLE 1

Synthesis of Multi-Wall Carbon Nanotubes

Multi-wall carbon nanotubes were synthesized by a chemical vapor deposition method. A liquid mixture of xylene and ferrocene (0.75 atomic %) was injected into the preheater of a two-stage quartz reactor at a temperature of 200° C. This temperature allows the precursor to volatize, and is then swept into the main zone of the reactor by a mixture of argon and hydrogen. The main furnace is kept at a temperature of ~750° C. The nanotube growth is seeded by Fe particles, and results in a continuous, aligned "carpet" on substrates and reactor walls.

EXAMPLE 2

Blending of Carbon Nanotubes into Mesophase Pitch

The "carpets" of multi-wall carbon nanotubes, as obtained from the Example 1, were mixed with pellets of a naphthalene-derived mesophase pitch in a Brabender intensive mixer. The pitch had a 272° C. softening point and 100% anisotropy and was prepared with an $HF/BF_3$ catalyst, supplied by Mitsubishi Gas Chemical Company. The bulk density and metal content of the mesophase pitch were 0.66 g/cc and 12.0 ppm, respectively.

A range of concentrations was explored: 0.1 wt % to 1.0 wt % multi-wall nanotubes. An inert atmosphere was provided by the use of nitrogen as purge gas. To minimize the oxidation of pitch, the sample was loaded in the mixer at 220° C., purge gas flow started, and the temperature was then increased to 280° C. Mixing was carried out for 10 minutes. As noted above, the comparative fiber having 0% carbon nanotubes was subjected to the same mixing procedure as the loaded fibers in order to verify that the random microstructure achieved by the present invention is attributable to the presence of the carbon nanomaterials and not to the mixing step itself.

EXAMPLE 3

Fiber Extrusion

The present experiment was conducted in an Instron Capillary Rheometer, Model 3211. A single capillary with a diameter of 250 μm was used. The extrusion temperature was 305° C. The plunger speed was maintained at 0.2 cm/min.

For the pitch/carbon nanotube dispersion, spinnability was limited because nanotube bundles act as solid impurity. Such an impurity caused frequent breaking of filament during extrusion, particularly at 0.5 and 1.0 wt % MWNTs. It is emphasized that because it is not feasible to mix nanotubes in mesophase pitch by a solution route, the mixing must be conducted in the molten state. Therefore, a high degree of mixing may not have resulted. However, at lower concentrations (<0.5 wt %), it was feasible to extrude and draw down fibers containing MWNTs. Thus, fibers were extruded at 0%, 0.1% and 0.3% carbon MWNT loading, respectively. For all fibers the optimum spinning temperature was found to be 305° C., the draw down ratio was between 31 and 48, and the winding speed was 240 m/min. The pitch fiber containing carbon nanotubes could be spun continuously for 2–3 minutes.

EXAMPLE 4

Formation of Carbon Fibers

The pitch fibers produced in accordance with Example 3 were oxidatively stabilized by heating in air to a maximum temperature of 290° C. at a heating rate of 0.5 to 1.0° C./min for seven hours. The stabilized fibers were carbonized at a temperature of 2400° C. for 30 minutes in an inert (helium gas purge) environment.

Figure 1:
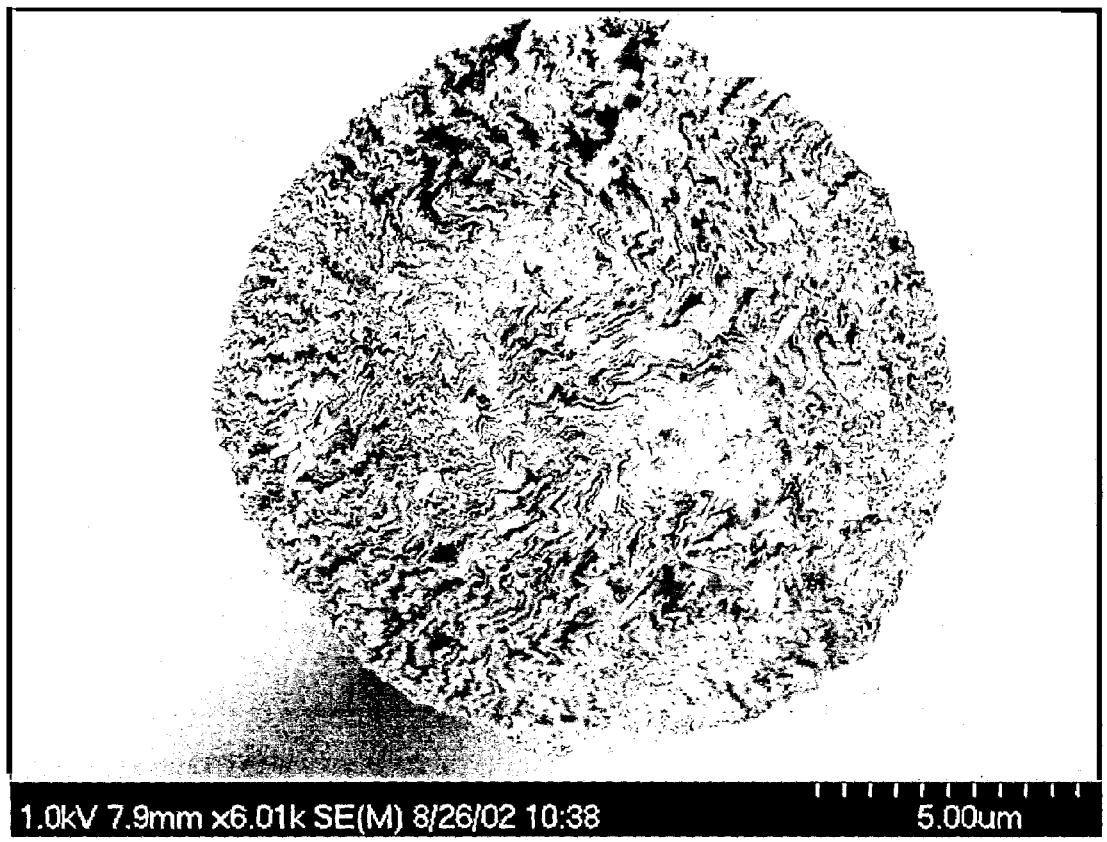
FIG. 1 is a scanning electron micrograph of a modified mesophase pitch-based carbon fiber containing 0.1 percent by weight of carbon nanotube reinforcements in accordance with the present invention.
Figure 2:
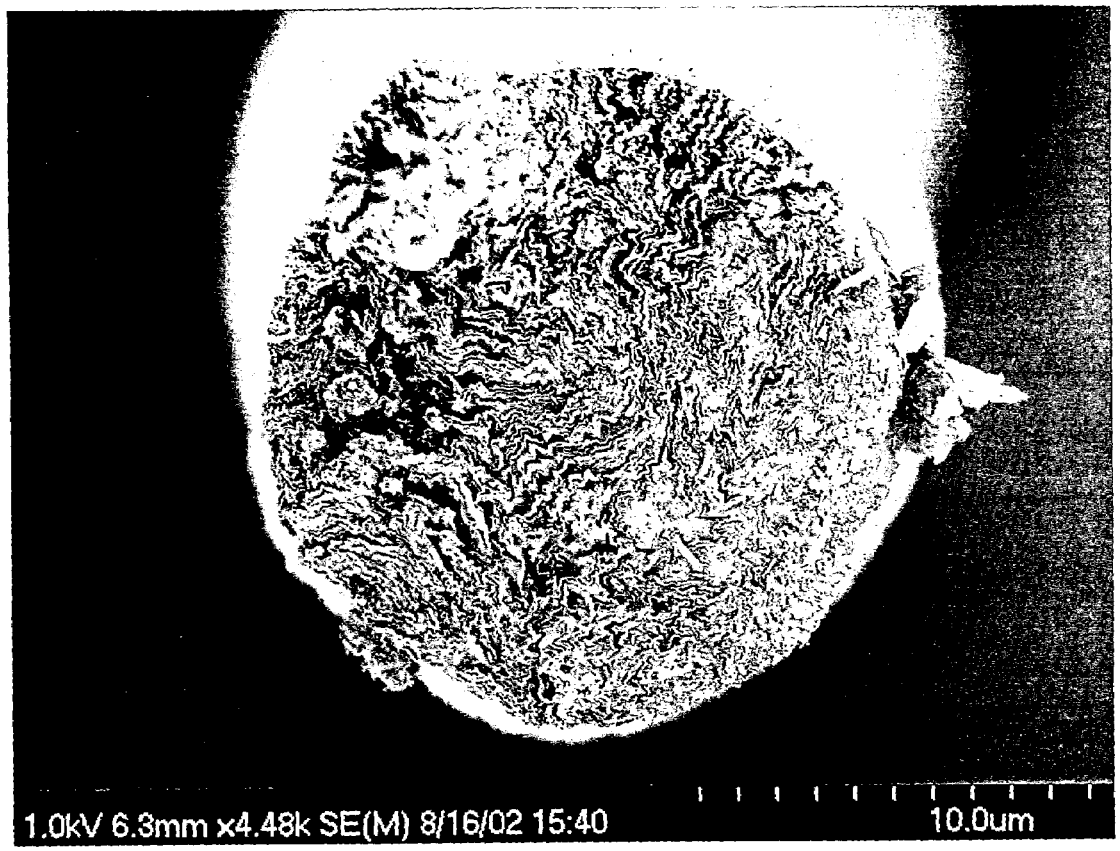
FIG. 2 is a scanning electron micrograph of a modified mesophase pitch-based carbon fiber containing 0.3 percent by weight of carbon nanotube reinforcements in accordance with the present invention.

FIGS. 1 and 2 are scanning electron microscopy micrographs of carbon fibers containing 0.1 percent by weight and 0.3 percent by weight of carbon nanotubes, respectively, as prepared by the present Example, clearly evidencing the random nature of the fiber morphology. Preliminary tensile property evaluation results are set forth in Table I, below.

TABLE I

Tensile Properties of Comparative and Nanotube-Modified Carbon Fibers

| Percent Loading | Diameter (μm) | Tensile Strength (GPa) | Modulus (GPa) | Strain to Failure (%) |
|---|---|---|---|---|
| 0.0 wt.% | 12 ± 1 | 2.1 ± 0.5 | 570 ± 120 | 0.38 ± 0.01 |
| 0.1 wt.% | 15 ± 2 | 1.4 ± 0.4 | 330 ± 140 | 0.50 ± 0.18 |
| 0.3 wt.% | 15 ± 2 | 0.7 ± 0.1 | 260 ± 50 | 0.28 ± 0.01 |

EXAMPLE 5

Quantification of the Degree of Randomness of the Modified Fibers

Figure 3:
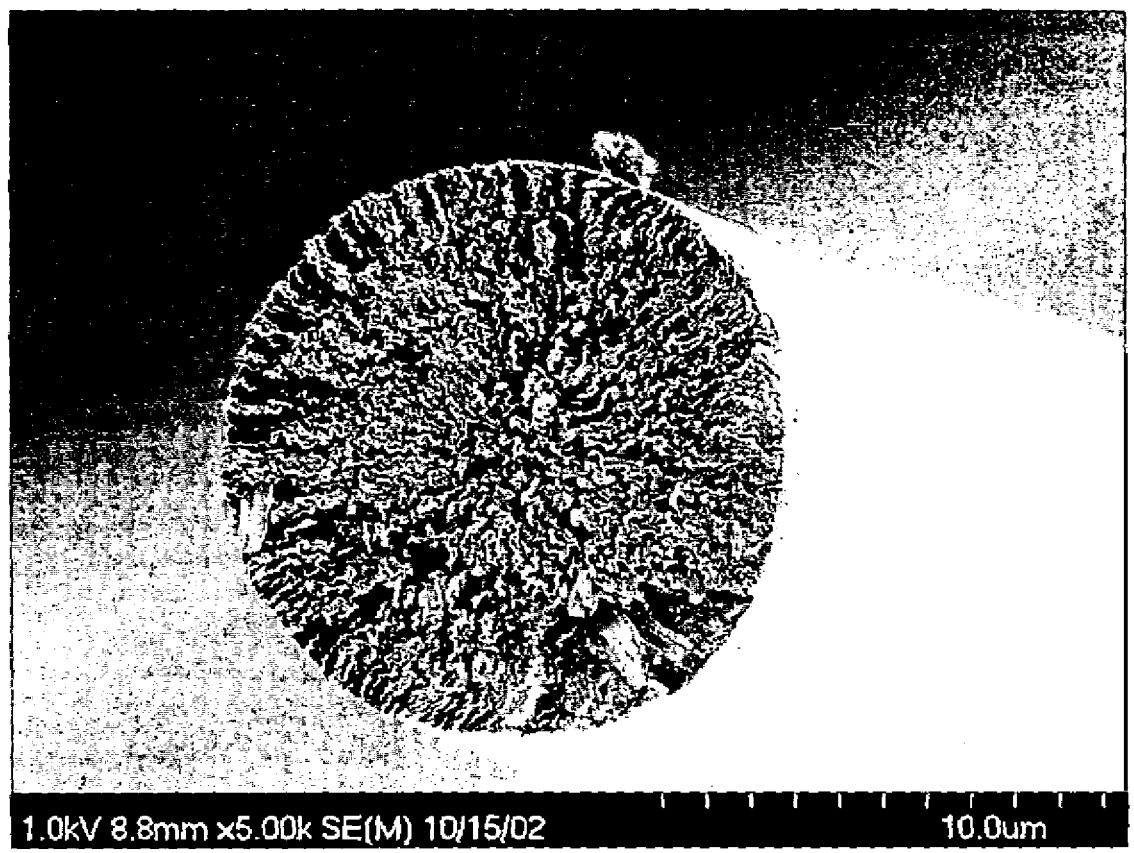
FIG. 3 is a scanning electron micrograph of a prior art, non-modified mesophase pitch-based carbon fiber.
Figures 5A, 5B, 5C, 5D:
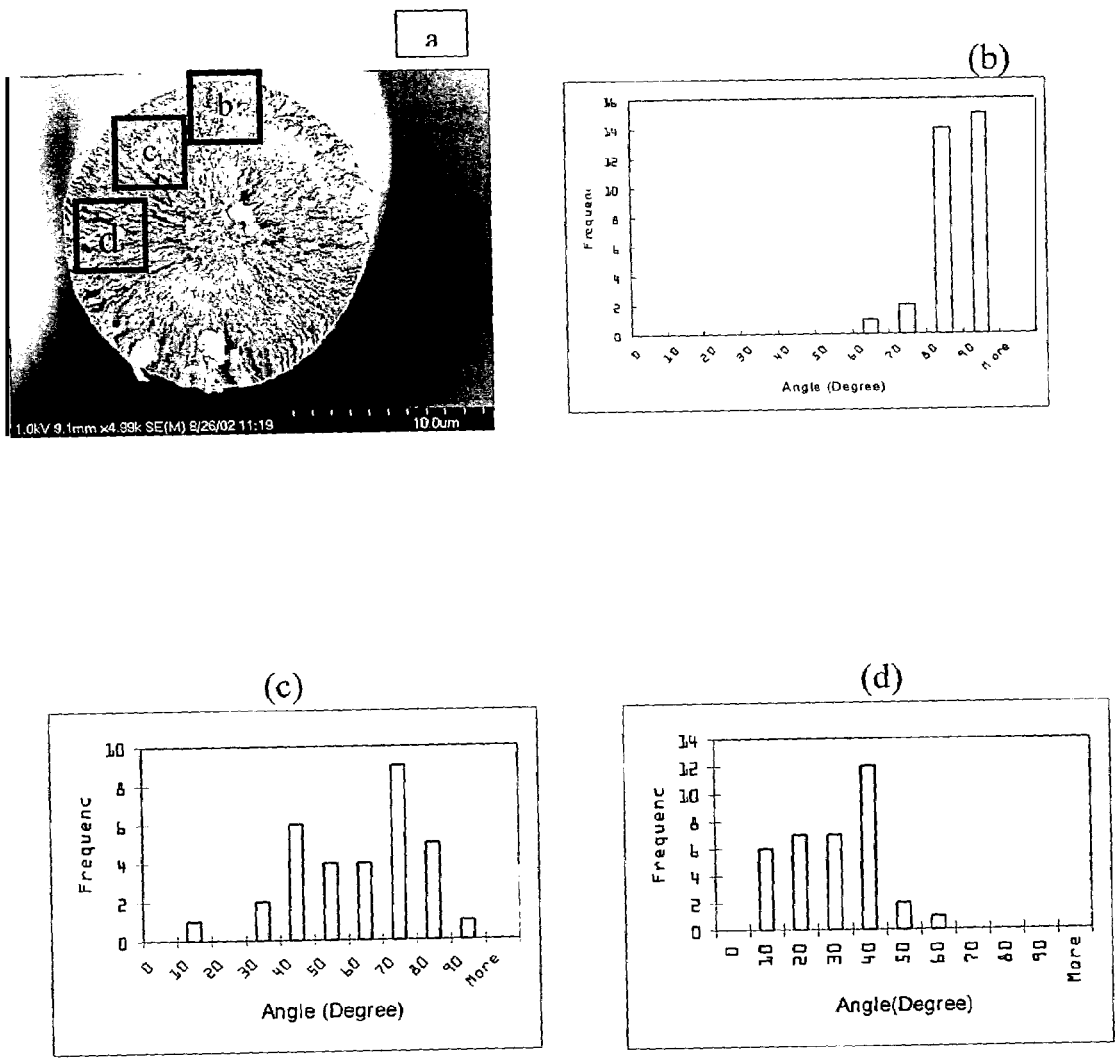
FIG. 5A is the scanning electron micrograph presented in FIG. 3 with regions b, c, and d identified, located 90°, 45°, and 0°, respectively, to the horizontal reference direction.
FIGS. 5B, 5C, and 5D are histograms displaying the frequency of orientation angles of the graphene layers within each of regions b, c, and d of the fiber of FIG. 5A.
Figure 6A:
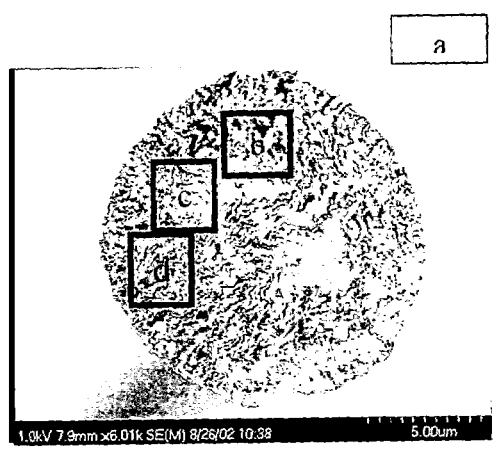
FIG. 6A is the scanning electron micrograph presented in FIG. 1 with regions b, c, and d identified, located 90°, 45°, and 0°, respectively, to the horizontal reference direction.
Figure 6B:
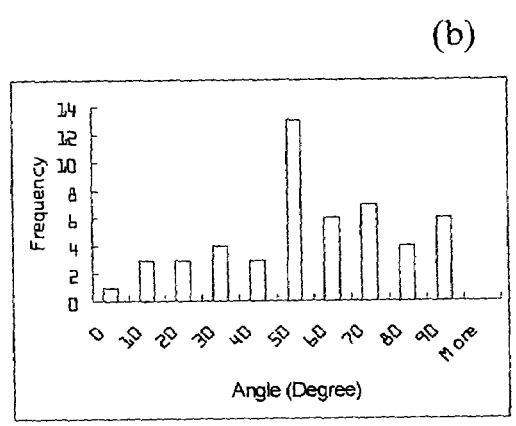
FIGS. 6B, 6C, and 6D are histograms displaying the frequency of orientation angles of the graphene layers within each of regions b, c, and d of the comparative fiber of FIG. 6A.
Figure 6C:
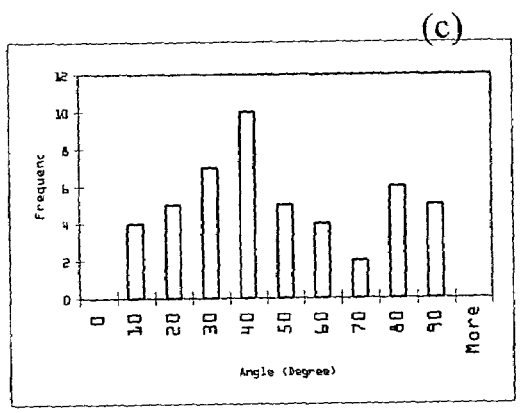
Figure 6D:
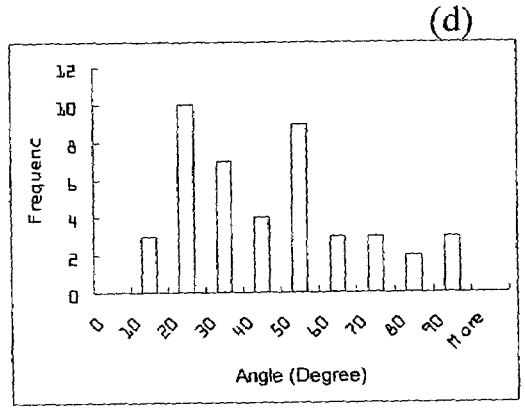

To examine the graphene layer orientation of comparative and inventive fibers prepared in accordance with Examples 1–4, three regions were selected on a fiber transverse section; the regions were located at 90°, 45° and 0° with respect to the horizontal reference direction. The fibers analyzed in this manner were the fibers set forth in the micrographs of FIG. 3 (0% loading) and FIG. 1 (0.1% loading). The micrograph of the comparative fiber of FIG. 3 is reproduced in FIG. 5A with regions b (90°), c (45°), and d (0°) identified. Similarly, the micrograph of the inventive fiber of FIG. 1 is reproduced in FIG. 6A with regions b (90°), c (45°), and d (0°) identified. Histograms displaying the frequency as a function of orientation angle of the graphene layers for the pure mesophase pitch fiber of FIG. 5A are depicted in FIGS. 5B, 5C, and 5D with respect to regions b, c, and d of FIG. 5A, respectively. The occurrence of maxima in the three plots at average angles of 78, 52, 25 (close to the expected values of 90°, 45° and 0°, respectively), confirms the center-converged radial structure for carbon fibers produced from pure pitch. In contrast,. histograms for the composite fiber of FIG. 6A, presented in FIGS. 6B, 6C, and 6D, display a more uniform distribution of angles in each of the histograms; the average orientation angles were 49, 42, and 37. Thus, orientation angle distributions presented FIGS. 5B, 5C, 5D, 6B, 6C, and 6D quantitatively confirm the more random microstructure of the composite fibers relative to the pure pitch based fibers.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims. Moreover, Applicants hereby disclose all subranges of all ranges disclosed herein. These subranges are also useful in carrying out the present invention.

What is claimed is:

1. A modified, mesophase pitch-based carbon fiber comprising from about 0.05 percent to about 1.0 percent by weight of carbon nanomaterial reinforcements.

2. The modified carbon fiber set forth in claim 1 comprising from about 0.1 percent to about 0.5 percent by weight of carbon nanomaterial reinforcements.

3. The modified carbon fiber set forth in claim 1 wherein the carbon nanomaterial reinforcements comprise carbon nanotubes.

4. The modified carbon fiber set forth in claim 3 wherein the carbon nanotubes comprise multi-wall carbon nanotubes.

5. The modified carbon fiber set forth in claim 1 comprising decreased tensile modulus.

* * * * *